Patented Oct. 19, 1954

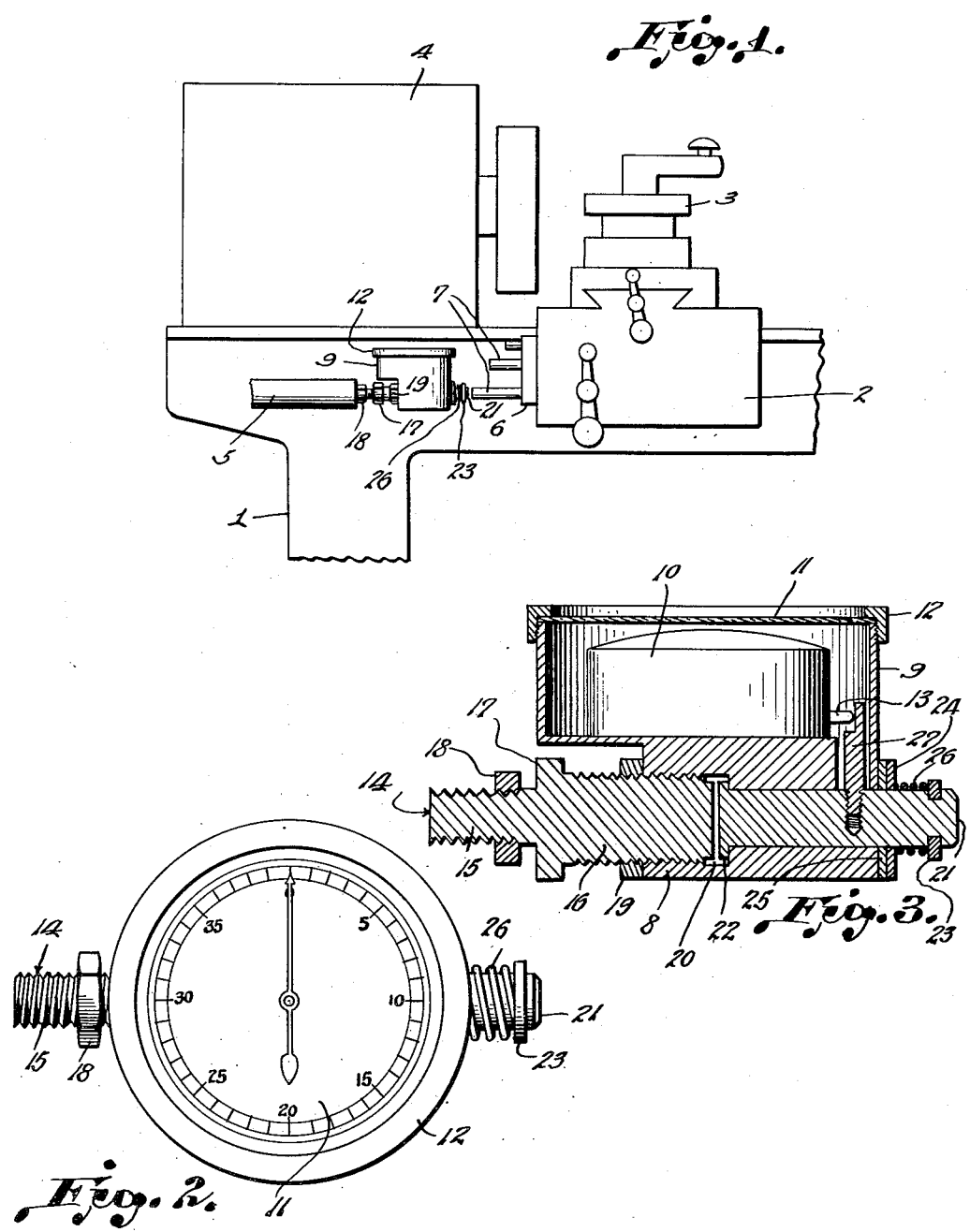

2,691,914

UNITED STATES PATENT OFFICE 2,691,914

PRECISION MACHINE AND TURRET LATHE STOP

Russell R. Roby, Truro, Iowa

Continuation of abandoned application Serial No. 21,128, April 15, 1948. This application April 5, 1952, Serial No. 280,706

1 Claim. (Cl. 82—21)

This invention relates to a precision machine and turret lathe stop and more particularly constitutes a continuation of my previous application Serial No. 21,128 filed April 15, 1948 and now abandoned, the same having been forfeited for non-payment of the final fee on December 26, 1950.

It is to be understood that turret lathes are equipped by the manufacturers with a stop rod, which is used as a fixed stop for adjustable stop roll pins, with the stop roll located on a lathe carriage; therefore, this is the method used to locate the lathe carriage at the desired position.

An object of this invention is to mount my stop or device on a regular lathe stop rod and when the push rod is contacted by one of the adjustable lathe stop pins, this action moves the push rod lever arm in contact with the dial indicator point until the dial indicator reads the proper pre-set reading; this then gives precision reading of the lathe carriage position, and is one of the advantages of my stop.

Another object of this invention is that this stop or device may be used in combination with a fixed stop to indicate to the operator how hard to push the fixed stop, or on work that does not require precision, my stop can be disregarded and the ordinary lathe fixed stops used exclusively.

With the foregoing and other objects in view, this invention comprises certain novel constructions, combinations, and arrangements of parts as will be hereinafter fully described, illustrated in the accompanying drawings, and more particularly pointed out in the appended claim.

Referring to the drawings:

Figure 1 is a view in elevation of a turret lathe showing my invention attached thereto.

Figure 2 is a top plan view of a device constructed in accordance with the present invention, while Figure 3 is a vertical, longitudinal, sectional view of the same.

Referring to the drawings, in which the preferred embodiment of my invention is illustrated, 1 designates a lathe, 2 is the lathe carriage, while 3 is the lathe turret. The lathe head stock 4 is mounted upon the lathe 1. The lathe is also provided with a lathe stop rod 5. The lathe carriage 2 is provided with a lathe stop roll 6, which stop roll is provided with the different length horizontal stop roll adjusting screws 7.

My invention comprises a stop or device which has a body 8 integral with the casing 9, Fig. 3. Within the casing 9 is a dial indicator 10, which can be seen through the glass or transparent sheet 11. A bezel 12 holds glass 11 on casing 9. The dial indicator 10 is provided with a point 13.

An anvil or mounting section 14 is provided, which comprises an outer threaded portion 15 and an inner threaded portion 16. A mounting and adjusting nut 17 is formed on the section 14 at the inner ends of portions 15 and 16. The smaller outer portion 15 is threaded into stop rod 5, Fig. 1, and a lock nut 18 is screwed against the stop rod 5, securely fastening the device upon said stop rod 5. The inner end 16 of the section 14 is threaded longitudinally into body 8, with a lock nut 19 pressing against a portion of body 8, whereby the body 8 is securely retained upon portion 16 against accidental displacement. Within the body 8 is a pocket 20. A push rod 21 extends into body 8 and is slidably mounted thereon. The inner end of push rod 21 is flanged as at 22. Outside of the body 8 and on the outer end of the push rod 21 is a retaining ring 23. A washer 24 and a felt seal 25 are also on push rod 21. A coil spring 26 is on push rod 21 between washer 24 and retaining ring 23. This spring 26 exerts outward pressure upon retaining ring 23 so as to normally keep the push rod arm 27 free of point 13. This push rod arm 27 is threaded into push rod 21. When push rod 21 is struck by one of the screws 7, it will be pushed inwardly, the flange 22 having a slight movement in pocket 20, at the same time the push rod arm 27 engages point 13 and actuates the dial indicator.

The operation of the device is as follows: When the lathe carriage 2 is moved to the left, stop roll adjusting screws 7 are moved into contact with the push rod 21, which in turn moves push rod arm 27 to contact dial indicator point 13 and rotate dial indicator hand to proper pre-set position for the lathe operation. Other positions of the lathe carriage are accurately made by turning stop roll 6 and repeating this procedure.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

The combination with a lathe having a bed, a stop rod extending alongside of said bed, a carriage movable along said bed, a stop roll revolvably mounted on said carriage to revolve on an axis parallel to said stop rod, and stop adjusting screws spaced around said axis for movement selectively into alignment with said stop rod; of micrometric stop adjusting means between the proximal ends of the stop rod and the adjusting screw aligned therewith, said micrometric means comprising a supporting member having a nut formed intermediate its ends and having one end screwed axially into the end of the stop rod, said end having a lock nut thereon, a sleeve-like body having a bore therethrough, said supporting member having its remaining end screwed into one end of said bore, the remaining end of said bore being of less diameter than the first end, a lock nut on the end of said member engaging in said bore, a plunger slidably mounted in the smaller end of said bore and having a head on its inner end within the larger end of said bore, spring means urging said plunger outwardly said plunger having its movement adjusted and restricted by said supporting member, an arm projecting radially from said plunger, and a dial indicator supported by said body and having an actuating pin in the path of said radial arm.

References Cited in the file of this patent

UNITED STATES PATENTS

| Number | Name | Date |
|---|---|---|
| 2,399,045 | Kylin | Apr. 23, 1946 |
| 2,406,793 | Benkoe | Sept. 3, 1946 |
| 2,506,236 | Overmyer | May 2, 1950 |
| 2,592,433 | Knosp | Apr. 8, 1952 |
| 2,604,000 | Kjellberg | July 22, 1952 |

OTHER REFERENCES

American Machinist, January 15, 1948. (page 120).